United States Patent [19]
Kawanowa et al.

[11] Patent Number: 5,216,523
[45] Date of Patent: Jun. 1, 1993

[54] SMALL DATA TERMINAL APPARATUS WITH CCD IMAGE SENSOR

[75] Inventors: Shigeyoshi Kawanowa; Hidehiro Ochiai, both of Yokohama, Japan

[73] Assignee: Matsushita Electric Industrial Co., Ltd., Kadoma, Japan

[21] Appl. No.: 602,962

[22] Filed: Oct. 25, 1990

[30] Foreign Application Priority Data

Oct. 27, 1989 [JP] Japan .................................. 1-280929
Oct. 27, 1989 [JP] Japan .................................. 1-280930
Oct. 27, 1989 [JP] Japan .................................. 1-280931

[51] Int. Cl.$^5$ .............................................. G06K 7/10
[52] U.S. Cl. ...................................... 358/471; 358/480
[58] Field of Search ............... 358/471, 473, 474, 481, 358/480; 235/472, 455

[56] References Cited

U.S. PATENT DOCUMENTS 3,636,250  1/1972  Haeff ..................... 358/480
4,516,017  5/1985  Hara et al. ............... 235/455

OTHER PUBLICATIONS

"Fax: The Principles And Practice of Facsimile Communication" Daniel M. Costigan, Chilton Book Co. 1971.

Primary Examiner—Stephen Brinich
Attorney, Agent, or Firm—Spencer, Frank & Schneider

[57] ABSTRACT

In a small-sized data terminal apparatus with an image input function, a CCD image sensor inputs an image of an object for photoelectric conversion. A mirror is provided between the CCD image sensor and the object, for reflecting the image of the object to input it into the CCD image sensor. A waveform shaping circuit converts the output signal from the CCD image sensor into a digital signal. A timing pulse generating circuit controls the waveform shaping circuit and the CCD image sensor. A memory circuit stores data. A communication circuit transfers the data to external equipment. A control circuit processes the output signal of the communication circuit and the memory unit. A display circuit displays the output of the control signal. In one embodiment, the CCD sensor is a CCD area image sensor. In another embodiment, a timing detector is used in conjunction with a motor that turns the mirror. In a further embodiment, a timing detector is used in conjunction with a roller which rotates when the data terminal apparatus is manually moved.

18 Claims, 8 Drawing Sheets

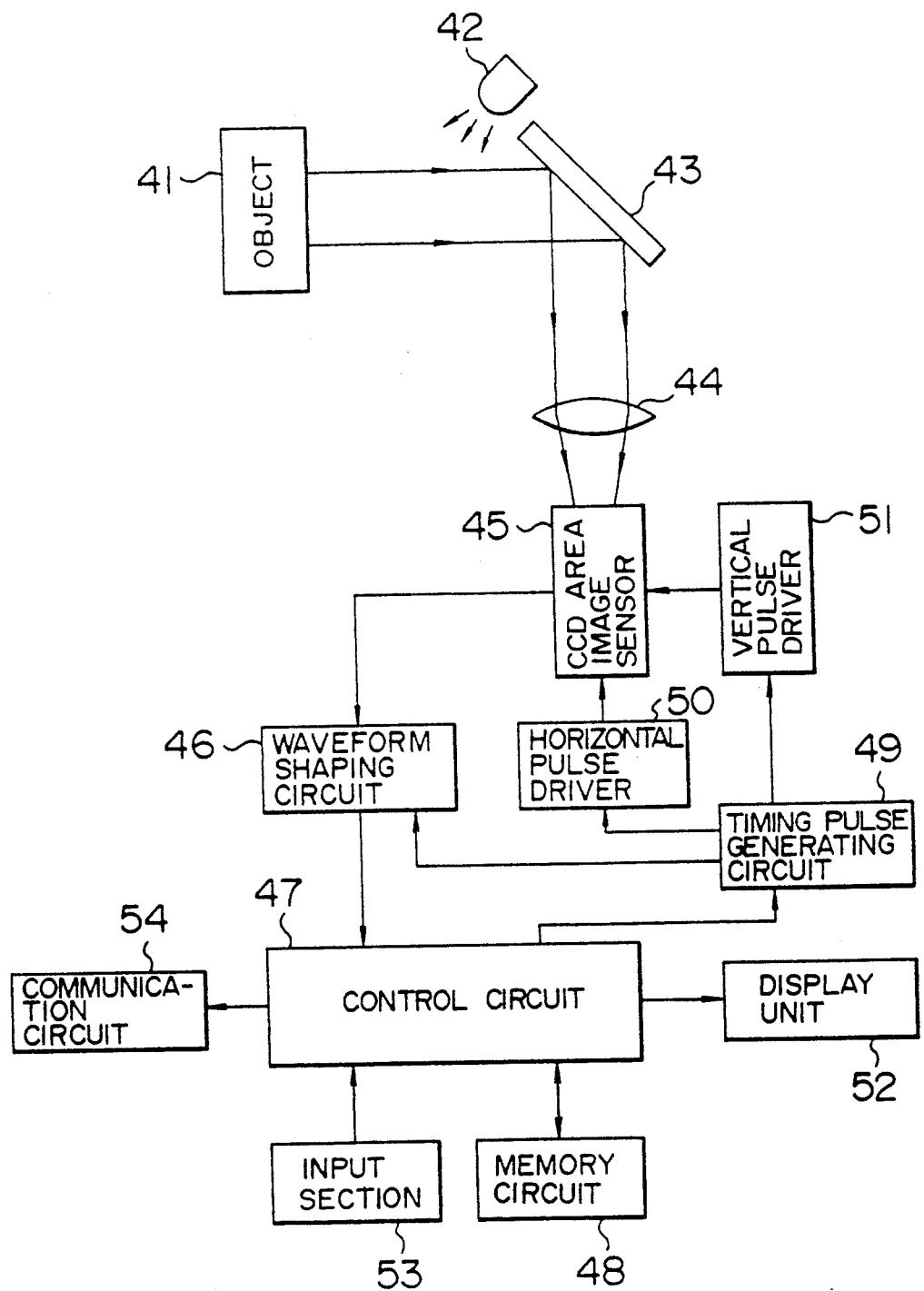

FIG. 8A
FIG. 8C
FIG. 8B
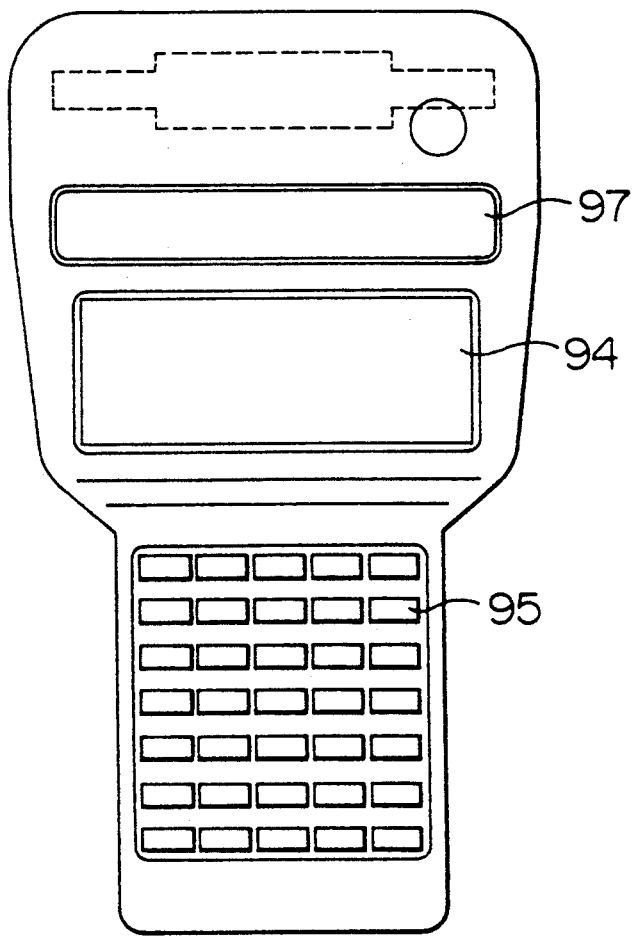
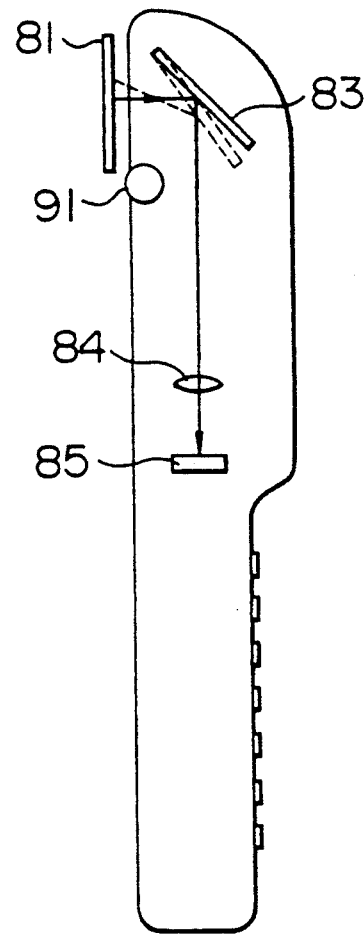
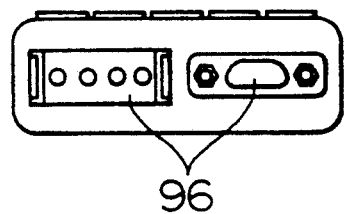

# SMALL DATA TERMINAL APPARATUS WITH CCD IMAGE SENSOR

BACKGROUND OF THE INVENTION

This invention relates to a small and portable data terminal apparatus for reading bar codes printed on paper or the like, reading, storing and displaying image data such as hand-written characters, and communicating with external equipment.

An apparatus combining a CCD scanner for reading bar codes and a small data terminal unit has been published. An example of its composition is shown in FIG. 1.

In FIG. 1, a surface of an object 1, on which the bar code is printed, is illuminated by a light source 2, and an image (bar code) of the object 1 is reflected by a mirror 3. The image is focused by a lens 4 on a CCD image sensor 5, which converts the incident light into an electric charge, transfers the signal charge by a CCD analog shift register, and outputs the stored charge in a serial manner. A waveform shaping circuit 6 shapes the output signal from the CCD image sensor 5 into a digital signal at specified timing. The digitized image data from the waveform shaping circuit 6 is passed through a control circuit 7 and stored in a memory circuit 8. A timing pulse generating circuit 9 is activated by the control circuit 7 and generates various kinds of timing pulses to operate the CCD image sensor 5. A CCD drive circuit 10 converts the timing pulses to specified voltage levels to operate the CCD image sensor 5. The image data (bar code pattern) stored in the memory circuit 8 is analyzed and converted into code data by the control circuit 7. Adisplay unit 11 shows the result of information processing by the control section 7. An input circuit 12 issues commands requesting various operations of the apparatus, and the commands are input into the control circuit 7. The above-mentioned code data and various items of information are passed through the control circuit 7, and output via a communication circuit 13 to external equipment.

As has been described, even conventional small data terminal equipment with a CCD scanner can read a unidimensional image (bar code), and digitize, store, analyze, display and output signals to external equipment.

A second example of the prior art is an image reader, the composition of which is shown in FIG. 2.

In FIG. 2, the surface of an object 21 is illuminated by a light source 22, and an image coming from the object 21 is reflected by a mirror 23. The image is focused by a lens 24 on a CCD image sensor 25, which converts the focused image into an electric charge and transfers the signal charge by a CCD analog shift register. The output from the CCD image sensor 25 is shaped into a specified waveform by a waveform shaping circuit 26 and becomes digital information. The digitized image data is output to external equipment 27. A timing pulse generating circuit 28 is activated by the external equipment 27 and generates various kinds of timing pulses. A CCD drive circuit 29 converts the timing pulses to specified voltage levels, which are used to drive the CCD image sensor 25. A roller 30 rotates when the apparatus is moved (made to slide). A timing detector 31 generates timing pulses as the roller 30 rotates. An amplifier 32 amplifies the timing pulses, and outputs the timing pulses to the external equipment 27. The external equipment 27 reads digitized unidirectional image data concerning the object 21, and stores and controls this data.

As described, while the apparatus is moved, the image reader of the second prior art example can read two-dimensional image data from the object, and digitize and output the data to the external equipment.

However, the above-mentioned prior-art small data terminal apparatus with a CCD scanner (FIG. 1) has the disadvantage that it cannot handle anything other than unidirectional images (bar code patterns). The prior art image reader (FIG. 2) can obtain two-dimensional image data by moving the apparatus, but has the disadvantage that the apparatus is not easy to handle because it is moved. Another disadvantage of this image reader is that the storage and display parts are included in the external equipment, and are not easy to handle.

SUMMARY OF THE INVENTION

This invention was made to solve the problems of the prior-art examples, and has as its object to provide a small data terminal apparatus with an excellent image input function which can obtain two-dimensional image data without moving the apparatus, and which has a control section, a display section, a storage section, an input section and a communication section mounted in an integral construction so that the terminal apparatus is easy to handle and is capable of being made portable.

In order to achieve the above object, the data terminal apparatus comprises an optical element including a mirror and a lens, a CCD area sensor (CCD two-dimensional sensor), a control section, a display section, a storage section, an input section and a communication section.

Therefore, according to this invention, two-dimensional image data can be obtained without moving the apparatus and the apparatus is easy to handle since the apparatus is made in an integral construction including the data processing section and is portable. In addition, if the image data is bar code patterns, they can be converted by an analysis program of the control section into code data, and since bar code patterns are two-dimensional information, matching of patterns is easy, facilitating the analysis.

BRIEF DESCRIPTION OF THE DRAWINGS

FIG. 3 is a schematic block diagram of the small data terminal apparatus with an image input function according to a first embodiment of this invention;

FIG. 8A is a front view showing an example of the external appearance;

FIG. 8B is a bottom view of the apparatus of FIG. 8A; and

FIG. 8C is a side view showing a conceptual construction of the optical system.

DESCRIPTION OF PREFERRED EMBODIMENTS

Figure 1:
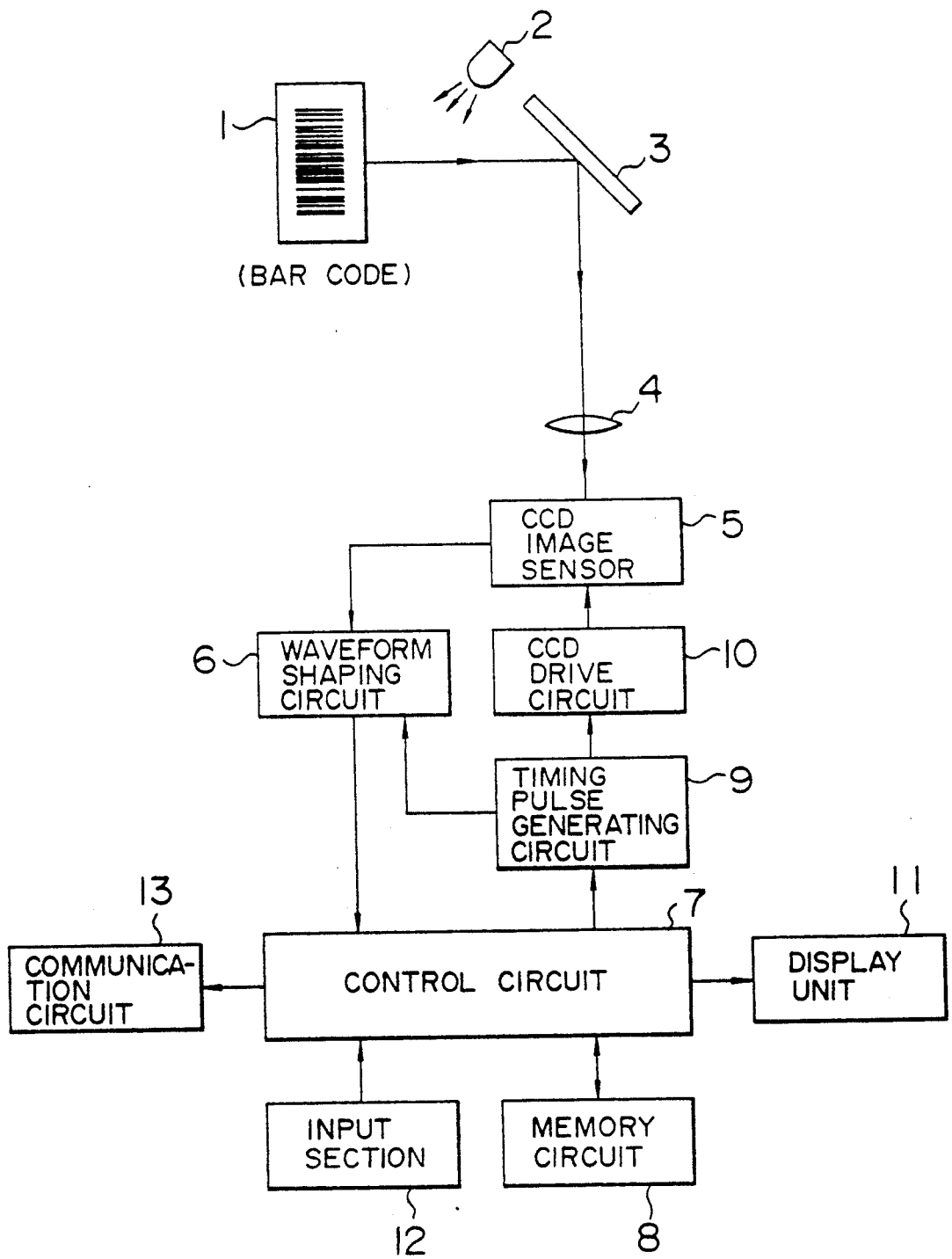
FIG. 1 is a block diagram of a conventional small data terminal apparatus with a CCD scanner.
Figure 2:
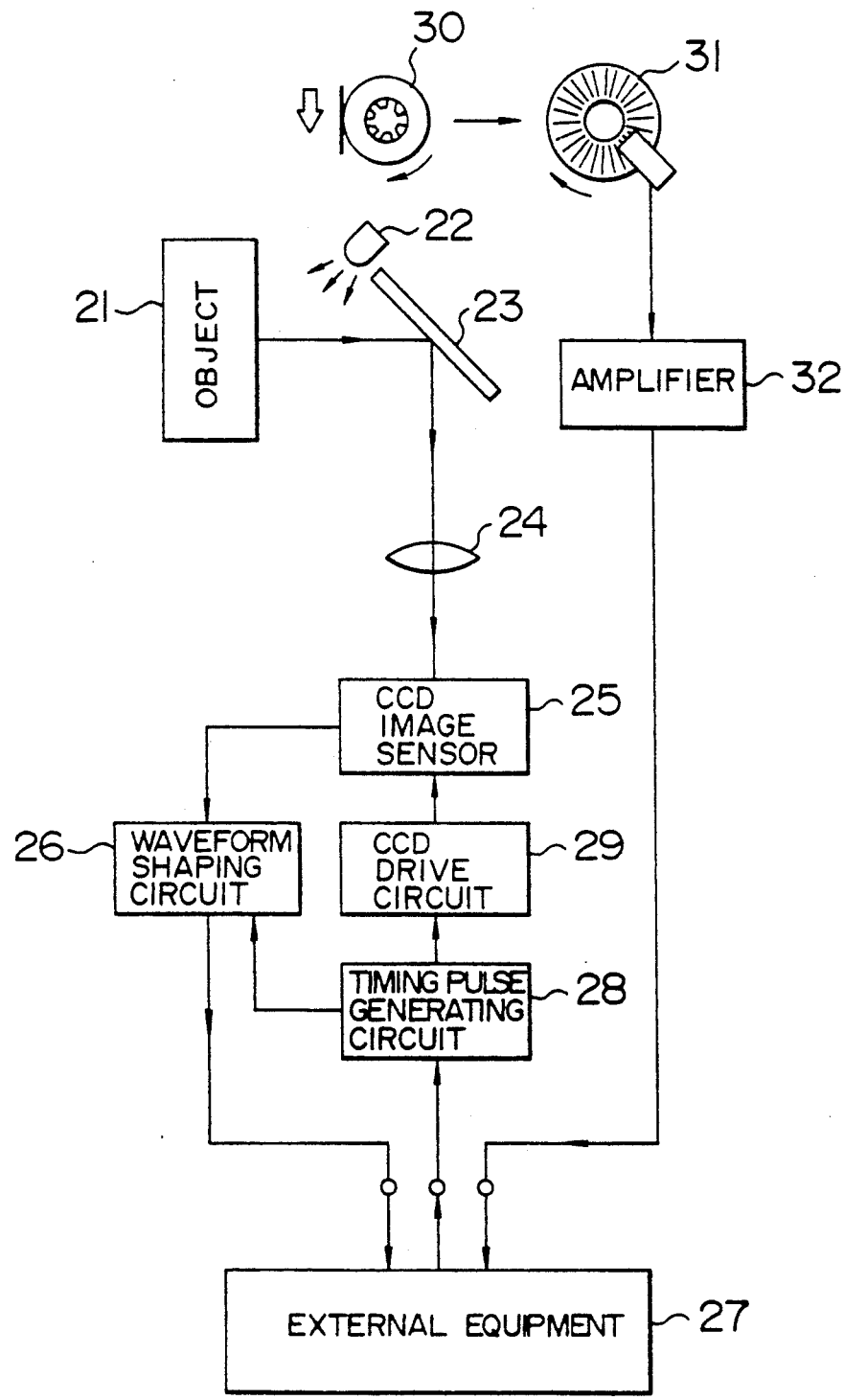
FIG. 2 is a block diagram of a conventional image reader.

FIG. 3 shows the composition of an embodiment of this invention. In FIG. 3, the surface of an object 41 is illuminated by a light source 42, and an image coming from the object 41 is reflected by a mirror 43. The image is focused by a lens 44 on a CCD area image sensor 45, which converts the focused image into an electric charge and transfers the signal charge by a CCD analog shift register. The CCD elements are arranged in a two-dimensional array. The output from the CCD image sensor 45 is shaped into a specified waveform by a waveform shaping circuit 46 at specified timing and becomes a digital signal. A control circuit 47 receives the digitized image data. A memory circuit 48 stores the image data. A timing pulse generating circuit 49 is activated by the control circuit 47 and generates various kinds of timing pulses to operate the CCD area image sensor 45. A horizontal pulse driver 50 and a vertical pulse driver 51 respectively convert the above-mentioned timing pulses to specified voltage levels to operate the CCD area image sensor 45. A display unit 52 shows image data stored in the memory circuit 48 and the results of information processing such as arithmetic operations and data retrieval. An input section 53 issues commands requesting various operations of the apparatus, and the commands are input into the control circuit 47. The image data stored in the memory circuit 48 and various items of information are passed through the control circuit 47, and output via a communication circuit 54 to an external apparatus or equipment.

As has been discussed, according to the above-mentioned first embodiment, two-dimensional image data can be obtained, and the apparatus can be made in an integral construction including a data processing section, so that the apparatus is easy to handle and can be made as a portable unit.

Figure 4A:
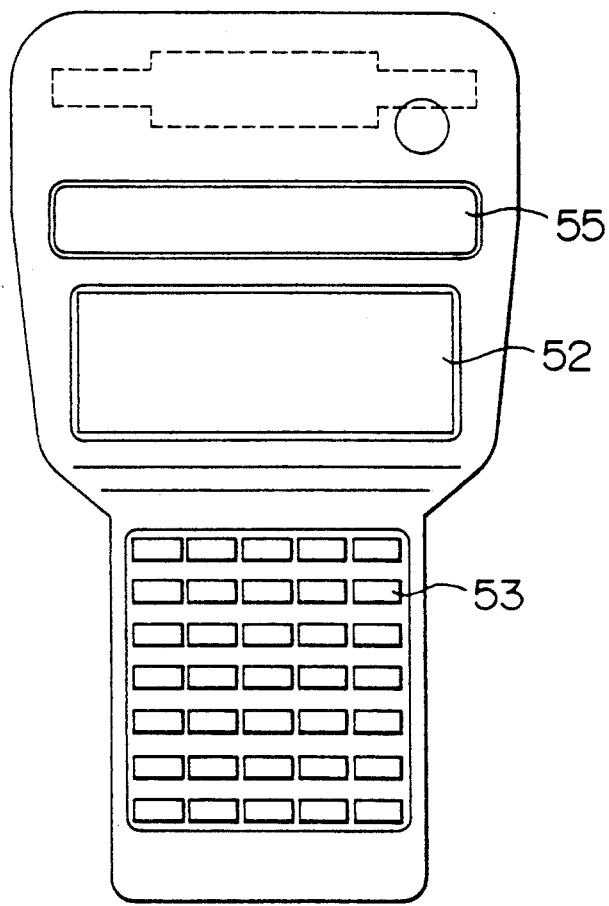
FIG. 4A is a front view showing an example of the external appearance of the apparatus of FIG. 3.
Figure 4C:
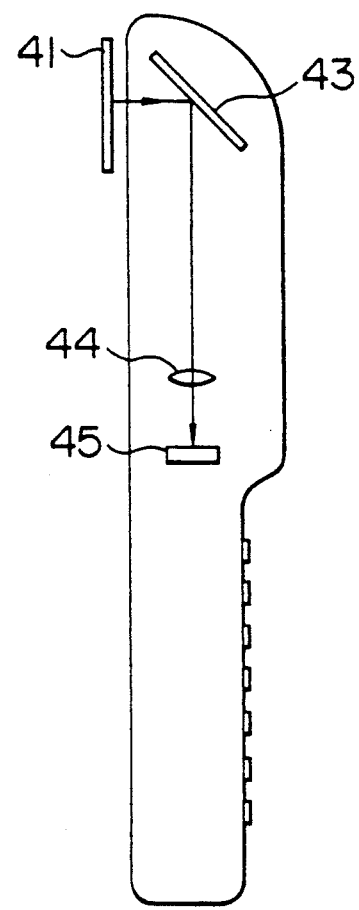
FIG. 4C is a side view showing a conceptual construction of the optical system.
Figure 4B:
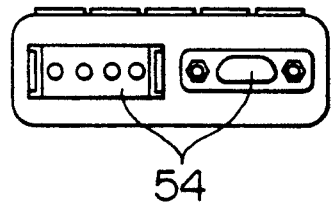
FIG. 4B is a bottom view of the apparatus of FIG. 3.

FIGS. 4A, 4B and 4C show the external appearance and the construction of the first embodiment of this invention. Reference numeral 41 represents the object, 43 is the mirror, 44 is the lens, 45 is the CCD area image sensor, 52 is the display unit, 53 is the input section, 54 is a connector for communication, and 55 is an aperture plate enabling direct viewing of an image of the object from above.

According to the first embodiment, the following effects can be obtained.

(1) The use of a two-dimensional CCD sensor obviates the need to move the apparatus and the apparatus is easy to handle.

(2) Made in an integral construction including the data processing section, the apparatus is easy to handle and portable.

(3) Two-dimensional image data is used, so that matching of bar code patterns and analysis of bar code patterns can be done easily.

Figure 5:
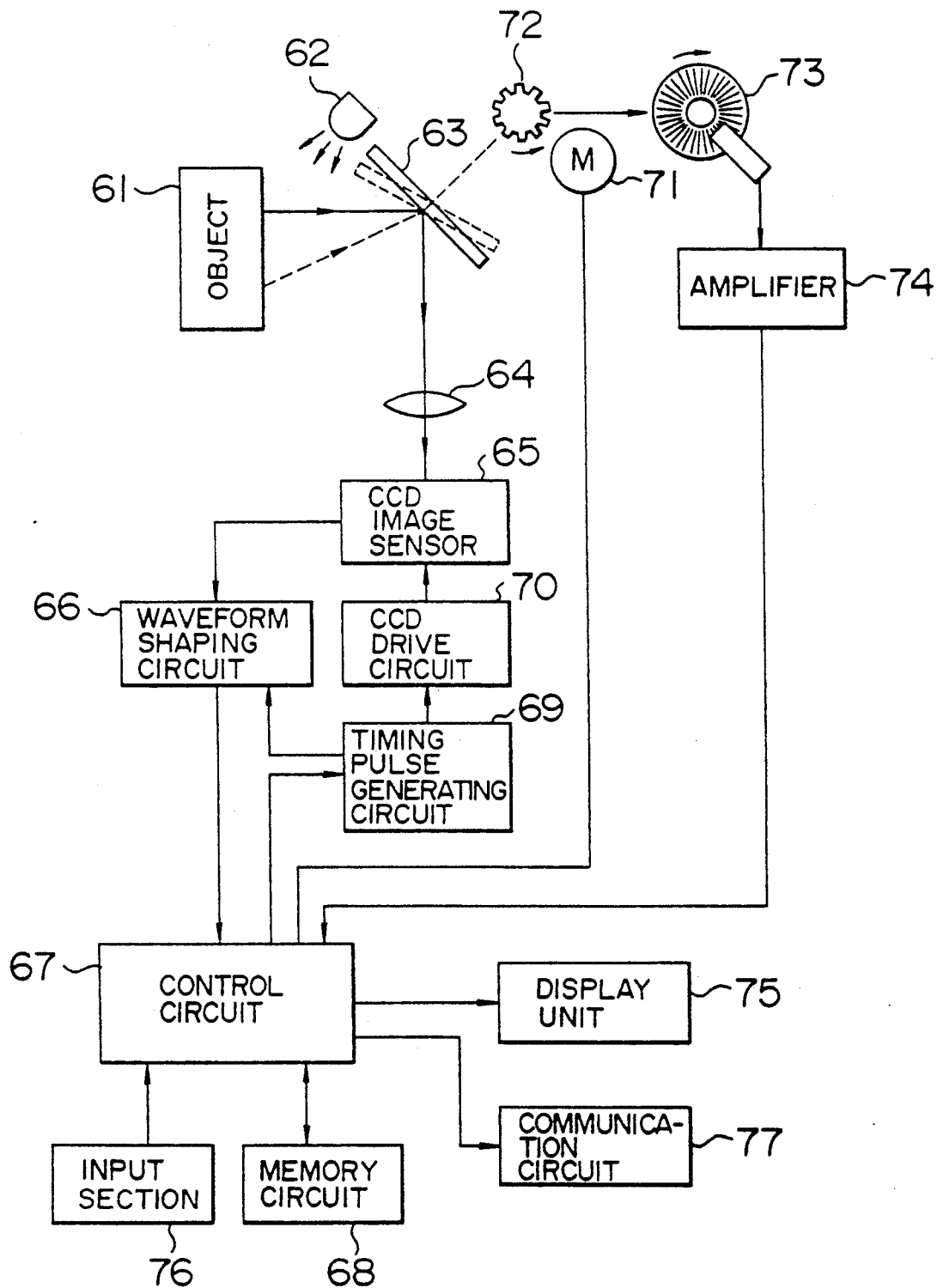
FIG. 5 is a schematic diagram of the small data terminal apparatus with an image input function according to a second embodiment of this invention.

FIG. 5 shows the composition of a second embodiment of this invention.

In FIG. 5, the surface of an object 61 is illuminated by a light source 62. An image coming from the object 61 is reflected by a mirror 63, and the image is focused by a lens 64 on a CCD image sensor 65. The image sensor 65 converts the focused image into an electric charge and transfers the stored signal charge by a CCD analog shift register. The CCD elements are arranged in a unidirectional array. A waveform shaping circuit 66 shapes the output from the CCD image sensor into a specified waveform at specified timing, thus converting the analog information into a digital signal. A control circuit 67 receives the digitized image data. A memory circuit 68 stores the image data. A timing pulse generating circuit 69 is activated by the control circuit 67 and generates various kinds of timing pulses to operate the CCD image sensor 65. A drive circuit 70 converts the timing pulses to specified voltage levels to operate the CCD image sensor 65. A display unit 75 shows the image data stored in the memory circuit 68 and the results of information processing such as arithmetic operations and data retrieval by the control circuit 67. An input section 76 issues commands requesting various operations of the apparatus and inputs the commands into the control circuit 67. The image data stored in the memory circuit 68 and various items of information are passed through the control circuit 67, and output via a communication circuit 77 to the external equipment or apparatus. A stepping motor 71 is controlled by the control circuit 67. A gear 72 decelerates the rotation of the stepping motor 71. In addition, the gear 72 causes the mirror 63 to rotate. A timing detector 73 generates timing pulses or signals in accordance with the rotation of the gear 72. An amplifier 74 amplifies the timing pulses, and outputs the timing pulses to the control circuit 67. The control circuit 67 reads the digitized unidirectional image data from the object each time a timing pulse mentioned above is generated and causes the memory circuit 68 to store the image data. The control circuit 67 causes timing pulses to be issued sequentially, so that two-dimensional image data can be collected and stored.

As mentioned above, according to the second embodiment, two-dimensional image data can be obtained and the apparatus is made in an integral construction including the data processing section, so that the apparatus is easy to handle and can be made as a portable unit.

Figure 6A:
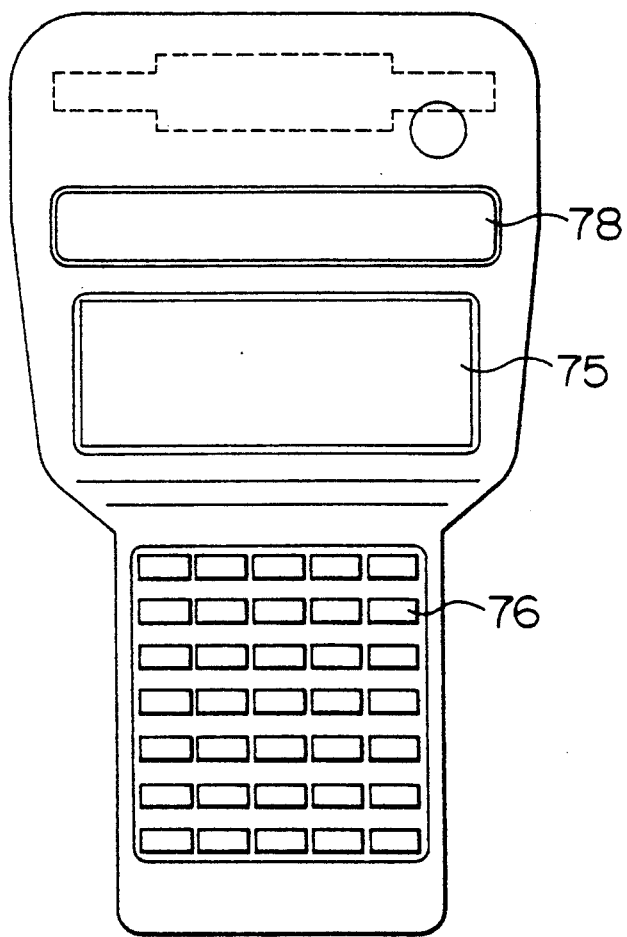
FIG. 6A is a front view showing an example of the external appearance of the apparatus of FIG. 5.
Figure 6C:
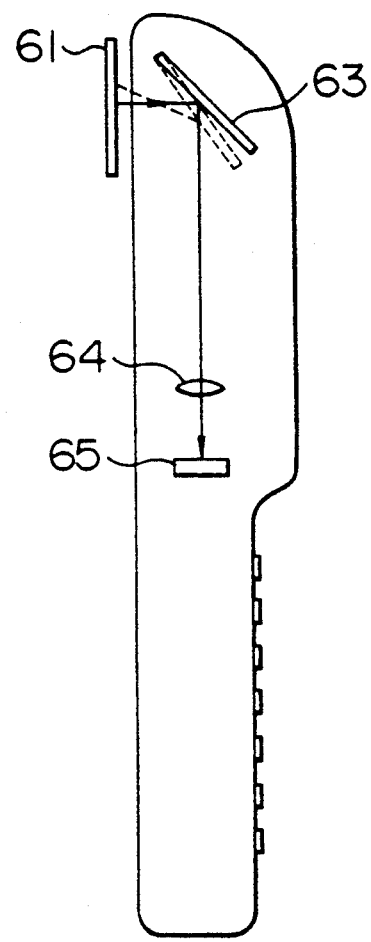
FIG. 6C is a side view showing a conceptual construction of the optical system.
Figure 6B:
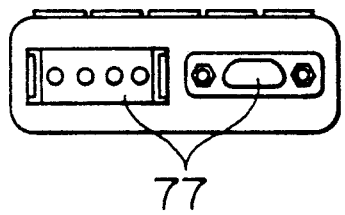
FIG. 6B is a bottom view of the apparatus of FIG. 6A.

FIGS. 6A, 6B and 6C show the external appearance and the construction of the second embodiment of this invention. Reference numeral 61 identifies object, 63 is the mirror, 64 is the lens, 65 is the CCD image sensor, 75 is the display unit, 76 is the input section, 77 is a connector for communication, and 78 is an aperture plate for direct viewing of the image of the object from above.

According to the second embodiment, the following effects can be obtained.

(1) By turning the mirror, two-dimensional image data can be obtained, so that the apparatus need not be moved and can be handled easily.

(2) Made in an integral construction including the data processing section, the apparatus is easy to handle and portable.

(3) Two-dimensional image data is used, so that matching of bar code patterns and analysis of bar code patterns can be done easily.

Figure 7:
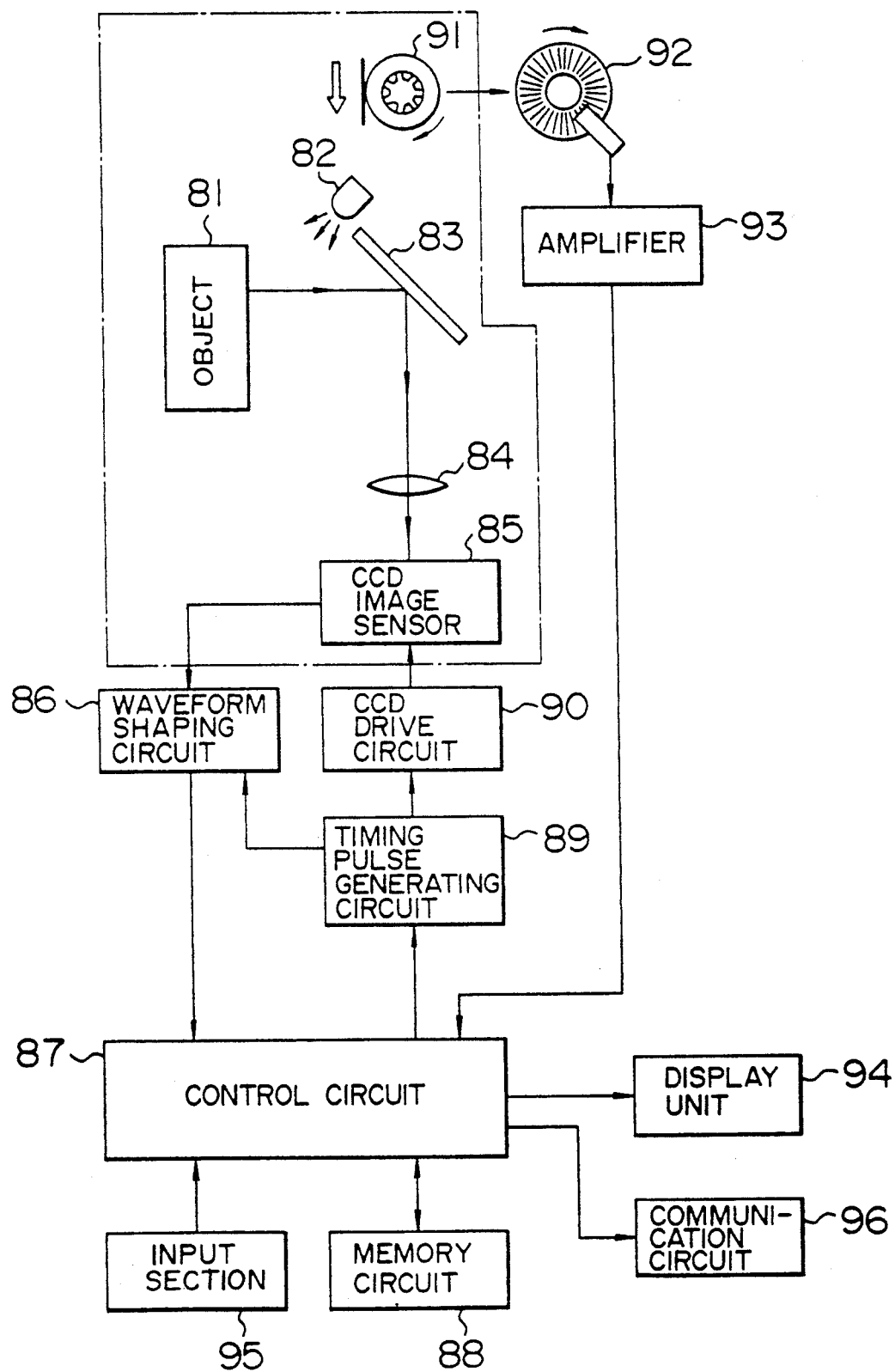
FIG. 7 is a schematic block diagram of the small data terminal apparatus with an image input function according to a third embodiment of this invention.

FIG. 7 sows the composition of a third embodiment of this invention.

In FIG. 7, the surface of an object 81 is illuminated by a light source 82. An image coming from the object 81 is reflected by a mirror 83, and the image is focused by a lens 84 on a CCD image sensor 85. The image sensor 85 converts the focused image into an electric charge and transfers the stored signal charge by a CCD analog shift register. The CCD elements are arranged in a unidirectional array. A waveform shaping circuit 86 shapes the output from the CCD image sensor into a specified waveform at a specified timing, thus converting the analog information into a digital signal. A control circuit 87 receives the digitized image data. A memory circuit 88 stores the image data. A timing pulse generating circuit 89 is activated by the control circuit 87 and generates various kinds of timing pulses to operate the CCD image sensor 85. A drive circuit 90 converts the timing pulses to specified voltage levels to operate the CCD image sensor 85. A display unit 95 shows the image data stored in the memory circuit 88 and the results of information processing such as arithmetic operations and data retrieval by the control circuit 87. An input sections 95 issues commands requesting various operations of the apparatus and inputs the commands into the control circuit 87. The image data stored in the memory circuit 88 and various items of information are passed through the control circuit 87, and output via a communication circuit 96 to the external equipment or apparatus. A roller 91 rotates when the apparatus is moved (made to roll). A timing detector 92 generates timing pulses as the roller 91 rotates. An amplifier 93 amplifies the timing pulses, and outputs the timing pulses to the control circuit 87. The control circuit 87 reads the digitized unidirectional image data from the object each time a timing pulse mentioned above is produced and causes the memory circuit 88 to store the image data. The control circuit 87 causes timing pulses to be issued sequentially, so that two-dimensional image data can be collected and stored.

As mentioned above, according to the third embodiment, two-dimensional image data can be obtained and the apparatus is made in an integral construction including the data processing section, so that the apparatus is easy to handle and can be made as a portable unit.

FIGS. 8A, 8B and 8C show the external appearance and the construction of the second embodiment of this invention. Reference numeral 81 represents the object, 83 is the mirror, 84 is the lens, 85 is the CCD image sensor, 94 is the display unit, 95 is the input section, 96 is a connector for communication, and 97 is an aperture plate for direct viewing of the image of the object from above, and 91 is the roller.

According to the third embodiment, the following effects can be obtained.

(1) By moving to slide the apparatus, two-dimensional image data can be obtained, and the apparatus can be handled easily.

(2) Made in an integral construction including the data processing section, the apparatus is easy to handle and portable.

(3) Two-dimensional image data is used, so that matching of bar code patterns and analysis of bar code patterns can be done easily.

We claim:

1. An improved small data terminal apparatus with an image input function for inputting an image of an object, storing signals of the image, obtained by two-dimensional photoelectric conversion, and transferring data composed of these signals to external equipment, wherein the improvement comprises: a housing having an aperture plate to permit a person to directly view the image of said object through the aperture plate.

2. A small data terminal apparatus with an image input function comprising:

a CCD image sensor for inputting an image of an object for photoelectric conversion;

a waveform shaping circuit for shaping an output signal of said CCD image sensor into a digital output signal;

a timing pulse generating circuit for controlling horizontal and vertical output timing of the output signal of said waveform shaping circuit and the output signal of said CCD image sensor;

a memory circuit for storing the output signal of said waveform shaping circuit;

a communication circuit for transferring data to an external apparatus;

a control circuit for processing output signals of said communication circuit and said memory circuit and controlling said timing pulse generating circuit;

a display unit for displaying an output signal of said control circuit; and a hand-holdable housing for the CCD image sensor, the waveform shaping circuit, the timing pulse generating circuit, the memory circuit, the communication circuit, the control circuit, and display section, the housing having an aperture plate for permitting a person to view the object directly.

3. The data terminal of claim 2, wherein the CCD image sensor is a CCD area image sensor which subjects the image to two-dimensional photoelectric conversion.

4. The data terminal of claim 2, further comprising an input section for issuing commands to the control circuit, the input section being mounted on the housing and having a plurality of manually operable keys.

5. The data terminal of claim 2, further comprising a mirror in the housing to reflect the image to the CCD image sensor, and a motor in the housing to turn the mirror.

6. The data terminal of claim 5, wherein the motor is a stepping motor.

7. The data terminal of claim 5, further comprising a timing detector in the housing to generate timing signals which are conveyed to the control circuit, the timing detector being operatively connected to the motor.

8. A small data terminal apparatus with an image input function comprising:

a CCD image sensor for inputting an image of an object for photoelectric conversion;

a mirror, provided between said CCD image sensor and said object, for reflecting the image of the object to said CCD image sensor;

a timing detector;

a stepping motor for turning said mirror and said timing detector, said timing detector generating timing signals;

a waveform shaping circuit for shaping an output signal of said sensor into a digital output signal;

a timing pulse generating circuit for controlling horizontal and vertical output timing of the output signal of said waveform shaping circuit and the output signal of said sensor;

a memory circuit for storing the output signal of said waveform shaping circuit;

a communication circuit for transferring data to an external apparatus;

a control circuit for processing of output signals of said communication circuit and said memory circuit; and a display unit for displaying an output of said control circuit.

9. The small data terminal apparatus of claim 8, further comprising a hand-holdable housing for the CCD image sensor, the mirror, the timing detector, the stepping motor, the waveform shaping circuit, the timing pulse generating circuit, the memory circuit, the communication circuit, the control circuit, and the display unit.

10. The small data terminal apparatus of claim 9, wherein the housing has an aperture plate for permitting a person to view the object directly.

11. The small data terminal of claim 10, further comprising an input section for issuing commands to the control circuit, the input section being mounted on the housing and having a plurality of manually operable keys.

12. The data terminal of claim 9, further comprising an input section for issuing commands to the control circuit, the input section being mounted on the housing and having a plurality of manually operable keys.

13. A small data terminal apparatus, comprising:
a CCD image sensor;
a mirror to reflect an image of an object to the CCD image sensor;
a motor operatively connected to the mirror;
a memory circuit;
means for actuating the motor to turn the mirror and for storing image data read by the CCD image sensor in the memory circuit;
a communication circuit to transfer signals between the means and an external apparatus; and
a hand-holdable housing for the CCD image sensor, the mirror, the motor, the memory circuit, the means, and the communication circuit.

14. The small data terminal apparatus of claim 13, wherein the motor is a stepping motor.

15. The small data terminal apparatus of claim 13, further comprising a timing detector in the housing, the timing detector being operatively connected to the motor and supplying timing signals to the means.

16. The small data terminal apparatus of claim 13, further comprising a display unit mounted on the housing and connected to the means.

17. The small data terminal apparatus of claim 13, further comprising an input section mounted on the housing and connected to the means, the input section having a plurality of manually operable keys.

18. The small data terminal apparatus of claim 13, further comprising an aperture plate mounted on the housing so as to permit a person to view the object through the aperture plate.

* * * * *